(12) United States Patent
Anzai et al.

(10) Patent No.: US 7,730,777 B2
(45) Date of Patent: Jun. 8, 2010

(54) FLOWMETER AND FLOW CONTROL DEVICE

(75) Inventors: Masanori Anzai, Tokyo (JP); Shoji Kamiunten, Tokyo (JP)

(73) Assignee: Yamatake Corporation, Tokyo (JP)

( * ) Notice: Subject to any disclaimer, the term of this patent is extended or adjusted under 35 U.S.C. 154(b) by 174 days.

(21) Appl. No.: 12/070,303

(22) Filed: Feb. 14, 2008

(65) Prior Publication Data

US 2008/0196493 A1 Aug. 21, 2008

(30) Foreign Application Priority Data

Feb. 19, 2007 (JP) ............................. 2007-037765

(51) Int. Cl.
*G01F 1/68* (2006.01)
(52) U.S. Cl. .................................. 73/204.11
(58) Field of Classification Search ............... 73/202.5, 73/204.11, 204.21; 374/138
See application file for complete search history.

(56) References Cited

U.S. PATENT DOCUMENTS

| 3,559,482 | A | 2/1971 | Baker et al. | |
|---|---|---|---|---|
| 4,885,938 | A | 12/1989 | Higashi | |
| 6,322,247 | B1 * | 11/2001 | Bonne et al. | 374/138 |
| 6,655,207 | B1 * | 12/2003 | Speldrich et al. | 73/202.5 |
| 6,779,395 | B2 * | 8/2004 | Hornung et al. | 73/204.21 |
| 6,843,122 | B2 * | 1/2005 | Kim et al. | 73/202.5 |
| 7,000,463 | B1 * | 2/2006 | Shajii et al. | 73/202.5 |
| 7,107,834 | B2 * | 9/2006 | Meneghini et al. | 73/204.21 |
| 2004/0123657 | A1 | 7/2004 | Kim et al. | |

FOREIGN PATENT DOCUMENTS

| JP | 2004-003887 A | 1/2004 |
|---|---|---|
| JP | 2006-118929 A | 5/2006 |

OTHER PUBLICATIONS

European Search Report dated Dec. 4, 2008, issued in counterpart European Application No. 08151377.2.
H.L. Boerrigter, et al., "Design & Calibration of an Unsteady Pressure Measurement System", *Instrumentation in Aerospace Simulation Facilities*, Sep. 29, 1997, pp. 185-194, New York, NY, USA.

* cited by examiner

*Primary Examiner*—Jewel Thompson
(74) *Attorney, Agent, or Firm*—Frishauf, Holtz, Goodman & Chick, P.C.

(57) ABSTRACT

A simply structured flowmeter in which an influence of a dilatational wave on a thermal flow rate sensor is suppressed, and measurement accuracy is enhanced.

The flowmeter has not only the thermal flow rate sensor that is placed to face a flow channel and detects a flow rate of fluid flowing through the flow channel but also a micro path (for example, narrow pipe) that is provided to the flow channel and blocks a dilatational wave created in the flow channel from being transmitted to the thermal flow rate sensor.

14 Claims, 11 Drawing Sheets

OSCILLATION FLOW

FIG. 2C

OSCILLATION FLOW

FIG. 3A
STEADY FLOW →

FIG. 3B
OSCILLATION FLOW

FIG. 3C
OSCILLATION FLOW

WITHOUT NARROW PIPE

FIG. 8B

WITH NARROW PIPE LOCATED UPSTREAM OF SENSOR

FIG. 8C

WITH NARROW PIPE LOCATED DOWNSTREAM OF SENSOR

FLOWMETER AND FLOW CONTROL DEVICE

BACKGROUND OF THE INVENTION

1. Field of the Invention

The present invention relates to a simply structured flowmeter that is excellent in response and measurement accuracy and to a flow control device using the flowmeter.

2. Description of the Related Art

Unexamined Japanese Patent Publication No. 2004-3887 discloses, as a flowmeter for accurately detecting a gas (fluid) flow rate, a thermal mass flowmeter that uses a flow rate sensor in which two temperature sensitive elements are placed with a heating element interposed between them in a gas flowing direction, and measures a mass flow rate of gas from temperature difference detected by temperature sensitive elements. As to such a flow rate sensor, for example, Unexamined Japanese Patent Publication No. 2006-118929 describes a flow rate sensor having a device structure in which a heating resistive element made of platinum or the like and two temperature-sensitive resistive elements are aligned on a choke made of silicon nitride, silicon oxide or the like, which is formed in the surface of a silicon chip.

Figure 20:
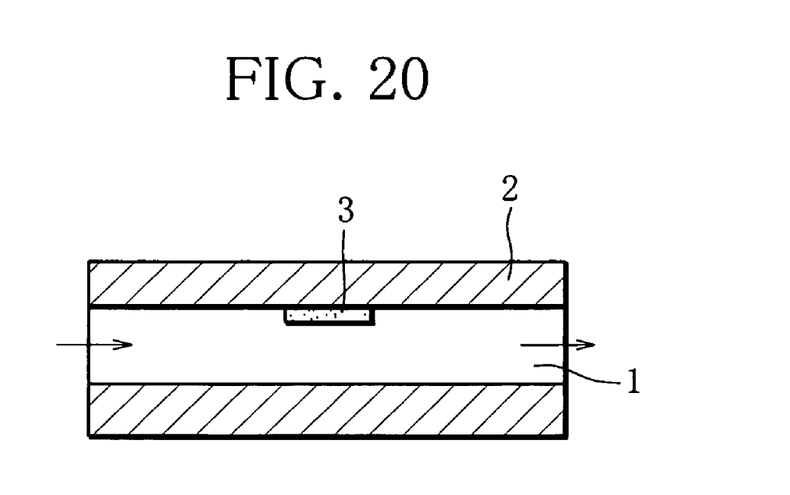
FIG. 20 is a schematic configuration view of a flowmeter using a thermal mass flowmeter.

Schematically speaking, a thermal mass flowmeter of this type is so constructed that a flow rate sensor 3 having the above device structure is disposed in the inner wall surface of a flowmeter body 2 in which a flow channel 1 is formed as shown in FIG. 20 so that the gas may flow along the flow rate sensor 3. The thermal mass flowmeter thus constructed is capable of detecting a flow rate in a minimal flow rate area, has wide flow-rate detection width (measurement range), and is excellent in detection response.

On the other hand, this thermal mass flowmeter has a drawback that, if a dilatational wave (compression wave) is created in the gas existing in the flow channel, for example, due to an impact applied to the flowmeter body 2, pipes of the flowmeter body 2 and the like, the dilatational wave is transmitted to the flow rate sensor 3. As a result, the flowmeter then detects the dilatational wave as a flow rate even when there is no gas flow. In short, because of its high detection sensitivity, the flow rate sensor 3 detects a transfer of gas molecules, which is caused by the dilatational wave, as if it is a gas flow. Therefore, the dilatational wave created in gas degenerates the measurement accuracy and measurement repeatability of the thermal mass flowmeter.

This is a serious issue especially when a minimal flow rate is to be measured. In general, a change of a sensor output which is caused by the dilatational wave of several hundred $H_Z$ or less is more significant than a sensor output corresponding to the minimal flow rate to be detected by the flow rate sensor 3. The minimal flow rate (signal component) that is aimed to be measured is prone to fade into disturbance (noise component) caused by the dilatational wave. As a result, the measurement accuracy and the measurement repeatability are degenerated.

Figure 21:
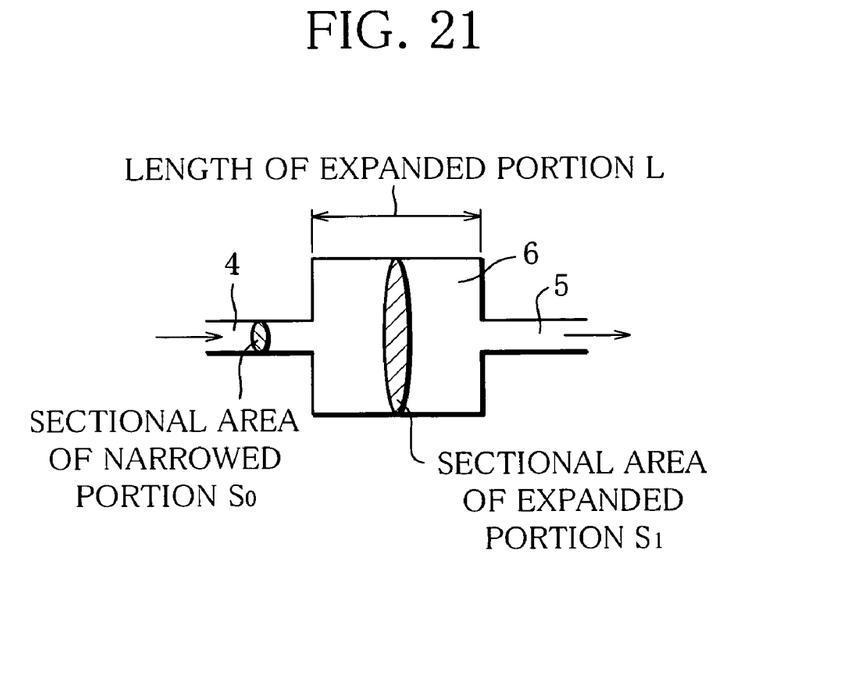
FIG. 21 is a view for explaining a schematic configuration and operation of a single hollow silencer.
Figure 22:
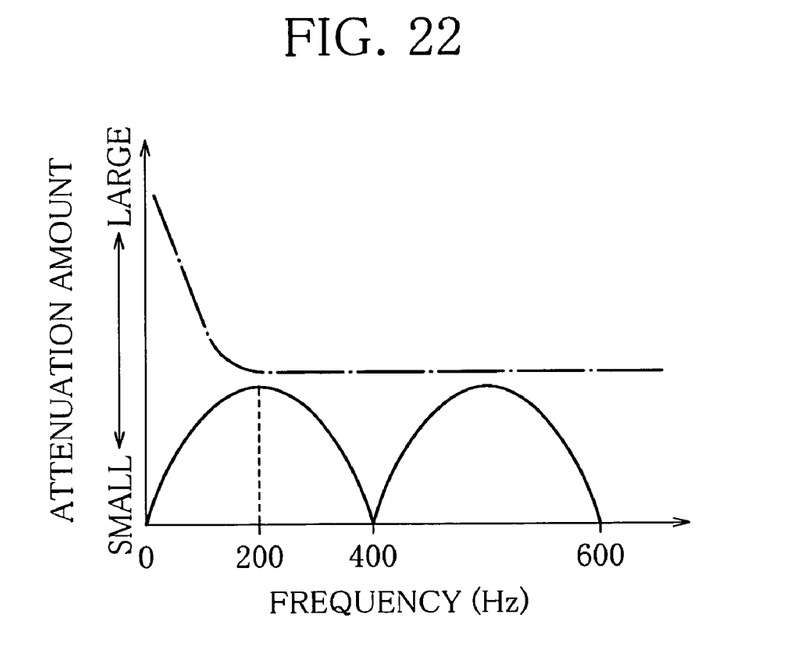
FIG. 22 shows an example of frequency characteristics of the single hollow silencer and frequency characteristics of the narrow pipe in contrast with each other.

As a device for attenuating the dilatational wave or the like, a single hollow silencer illustrated in FIG. 21 has been well known. This silencer is formed by reducing the diameters of the inlet and the outlet of the flow channel 1 to make the inlet and the outlet into narrowed portions 4 and 5, and thereby forming a spatial filter in the hollow (expanded portion) 6 between the narrowed portions 4 and 5. However, a silencer of this type effectively functions only with respect to certain frequency components because a sound deadening amount (attenuation amount) is frequency dependent as shown in FIG. 22. It is then very difficult to design the silencer for coping with the dilatational wave whose frequency is unspecific. It is especially difficult to deaden (attenuate) sounds at a low frequency of 100 $H_Z$ or less. Therefore, the silencer is not capable of effectively solving the above-described issue.

SUMMARY OF THE INVENTION

The present invention has been made in light of the above-mentioned circumstances. It is an object of the invention to provide a simply structured flowmeter in which an influence of a dilatational wave on a thermal flow rate sensor that is placed to face a flow channel, and measurement accuracy is enhanced while properties of the thermal flow rate sensor are exerted at the same time, and a flow control device having stable controllability that is achieved by using the flowmeter.

In order to achieve the above object, the flowmeter of the invention has a thermal flow rate sensor that is placed to face a flow channel and detects a flow rate (volume per unit time) of fluid flowing through the flow channel, and a micro path that is formed in the flow channel and blocks a dilatational wave created in the flow channel from being transmitted to the thermal flow rate sensor. Preferably, the micro path is located upstream or downstream of the thermal flow rate sensor in the flow channel to reduce flow-channel sectional area of the flow channel, and has a flow-channel sectional size that is approximately twice as large as thickness of a boundary layer produced by the dilatational wave created in the micro path. To be specific, if the flow-channel section is a micro path that is circular in shape, an internal diameter thereof is set approximately twice as large as the boundary layer thickness. If the flow-channel section is defined by parallel flat plates, spacing (opposed distance) of the parallel flat plates is set approximately twice as large as the boundary layer thickness. Preferably, the boundary layer thickness is that of either a velocity boundary layer or a thermal boundary layer, whichever is thinner, which is created by the dilatational wave. More preferably, the micro path is realized as a path having enough length to form the boundary layer produced by the dilatational wave in the inside of the micro path.

Preferably, the micro path may be formed by detachably installing a member into the flow channel formed in a flowmeter body so as to occlude the flow channel, and piercing the member. Alternatively, the micro path is formed by providing a narrow pipe having prescribed flow-channel sectional area and prescribed flow-channel length so as to penetrate the member that is detachably installed in the flow channel formed in the flowmeter body to occlude the flow channel.

Another flowmeter of the invention has a bypass channel that bypasses from a main channel, a thermal flow rate sensor that is interposed in the bypass channel, and a micro path that is formed in the bypass channel and blocks a dilatational wave created in the bypass channel from being transmitted to the thermal flow rate sensor. The flowmeter may further include, if necessary, a plurality of micro paths that have substantially the same size as the above-mentioned micro path and are formed in the main channel parallel to each other.

The flow control device of the invention has a flowmeter having the above-described structure, a flow control valve that regulates a flow rate of fluid flowing through the flow channel, and control means that controls an opening angle of the flow control valve according to an output of the flowmeter.

According to the flowmeter of the invention, since the micro path is formed in the flow channel attached with the thermal flow rate sensor, energy of the dilatational wave created in the flow channel is dissipated outside the flow channel. The flowmeter thus carries out an operation of blocking the transmission of the dilatational wave to the thermal flow rate sensor. It is therefore possible to eliminate an influence of the dilatational wave created in the flow channel while fully enjoying the properties of the thermal flow rate sensor. The flowmeter of the invention eliminates the concern that the dilatational wave created in the flow channel is erroneously detected as a gas flow when there is no fluid (gas) flowing through the flow channel. Consequently, in spite of a simple structure in which the micro path is formed in the flow channel attached with the thermal flow rate sensor, the flowmeter is stable in measurement and improved in measurement accuracy.

Preferably, the micro path has the flow-channel sectional size (internal diameter) that is approximately twice as large as thickness of the boundary layer produced by the dilatational wave which is formed in the micro path, and has enough length to form the boundary layer produced by the dilatational wave in the inside thereof. It is then possible to effectively dissipate the energy of the dilatational wave outside the flow channel by using shear stress that is generated by viscosity of the fluid in the boundary layer. Since the boundary layer thickness is that of either the velocity boundary layer or the thermal boundary layer, whichever is thinner, which is created by the dilatational wave, it is possible to effectively dissipate the energy of the dilatational wave outside according to properties of the fluid.

The micro path may be formed in the member that is detachably installed in the flow channel formed in the flowmeter body to occlude the flow channel. Moreover, the micro path may be formed of the narrow pipe having the prescribed flow-channel sectional area and the prescribed flow-channel length, and the narrow pipe can be fixed to the member that occludes the flow channel. Therefore, it is easy to design the flow channel, and the pipe can be installed in an existing flowmeter without difficulty. Consequently, the micro path has the advantage of making it possible to easily realize the flowmeter of the invention.

The another flowmeter of the invention makes it possible to set the flow rate of the fluid flowing through the main channel to be higher since the flow rate sensor is interposed in the bypass channel. Since the main channel includes the micro paths that have substantially the same size as the micro path of the bypass channel and are arranged parallel to each other, it is possible to prevent a split ratio (ratio of the flow rate of the fluid flowing through the bypass channel to that through the main channel) from being changed by temperature.

With the flow control device of the invention, a minimal flow rate of the fluid flowing through the flow channel can be accurately detected without an influence of the dilatational wave created in the flow channel. Therefore, the flow control device provides the advantage such as that the flow control valve, which is required to respond to implement control at high speed with a small amount of delay, can be carried out with high reliability and high accuracy.

Further scope of applicability of the present invention will become apparent from the detailed description given hereinafter. However, it should be understood that the detailed description and specific example, while indicating preferred embodiments of the invention, are given by way of illustration only, since various changes and modifications within the spirits and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitative of the present invention, and wherein.

DETAILED DESCRIPTION OF THE PREFERRED EMBODIMENTS

Embodiments of a flowmeter according to the invention and a flow control device that is constructed using the flowmeter will be described below with reference to the attached drawings.

Figure 1A:
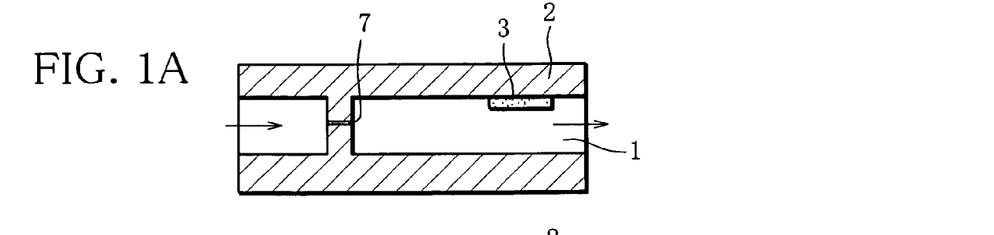
FIGS. 1A and 1B diagrammatically shows basic structures of a flowmeter according to the present invention.
Figure 1B:
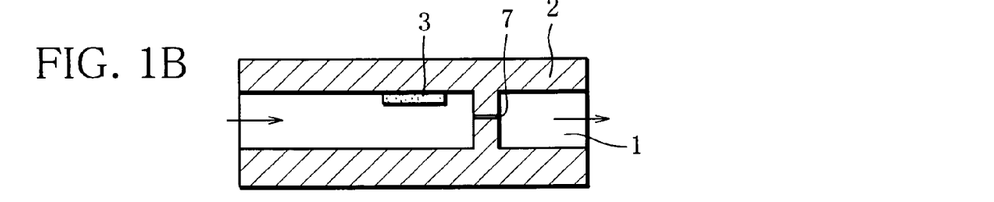

In the flowmeter according to an embodiment of the invention, as in a schematic configuration shown in FIGS. 1A and 1B, a thermal flow rate sensor 3 is attached onto an inner wall surface of a flow channel 1 provided to a flowmeter body 2. In the vicinity (upstream or downstream) of the thermal flow rate sensor 3 in the flow channel 1, there is disposed a narrow pipe 7 serving as a micro path that blocks a dilatational wave created in the flow channel 1 from being transmitted to the thermal flow rate sensor 3. If the narrow pipe 7 is set upstream of the thermal flow rate sensor 3, the narrow pipe 7 is preferably positioned at some distance from the thermal flow rate sensor 3 as shown in FIG. 1A so that a flow of gas that has passed through the narrow pipe 7 reaches the thermal flow rate sensor 3 after being stabilized. If the narrow pipe 7 is set downstream of the thermal flow rate sensor 3, it is not necessary to place the narrow pipe 7 at a great distance from the thermal flow rate sensor 3 as shown in FIG. 1B.

The narrow pipe 7 has prescribed flow-channel sectional area and prescribed flow-channel length as mentioned later, for example, in a fluid-flowing direction. The narrow pipe 7 is, for example, attached to a member 8 so as to longitudinally penetrate the member 8 that occludes the flow channel 1. The narrow pipe 7 has such flow-channel sectional area that does not disturb a to-be-measured flow rate (volume per unit time) of the gas flowing through the flow channel 1. If the to-be-measured flow rate is high, a plurality of narrow pipes (micro paths) 7 are arranged parallel to each other, for example, according to a maximum flow rate.

As described above, the narrow pipe 7 that operates to block the transmission of the dilatational wave to the thermal flow rate sensor 3 exerts a function of dissipating energy of the dilatational wave created in the flow channel 1 by using shear stress generated by viscosity of the gas in a (velocity) boundary layer that is produced by the dilatational wave in the flow channel 1. The dissipating of the dilatational wave energy is accomplished by converting oscillation energy of the dilatational wave into thermal energy, and then releasing the thermal energy outside the flow channel 1 through thermal conduction of the gas. More specifically, the thermal energy is released from the narrow pipe 7 and the member 8 carrying the narrow pipe 7 through the flowmeter body 2. Especially the narrow pipe 7 that exerts the above function is formed, as described below, to have a pipe diameter (flow-channel sectional size) that is approximately twice as large as thickness of a boundary layer produced by the dilatational wave and a enough pipe length to form the boundary layer produced by the dilatational wave in the narrow pipe.

Figure 2A:
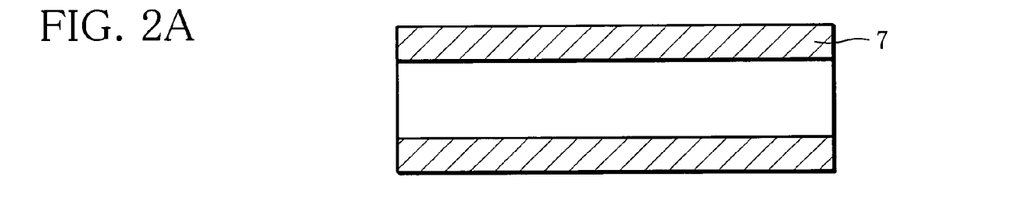
FIGS. 2A, 2B and 2C each diagrammatically show a velocity boundary layer that is produced in a narrow pipe due to an oscillation flow when there is no steady flow.
Figure 2B:
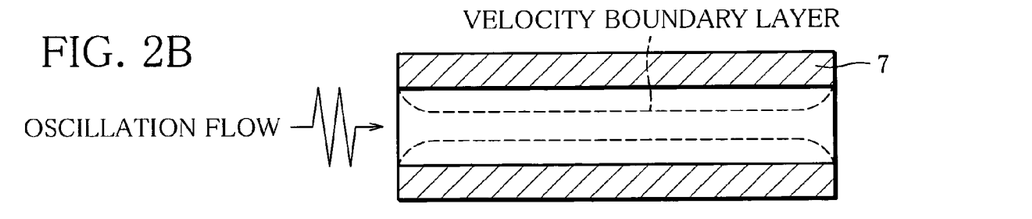
Figure 2C:
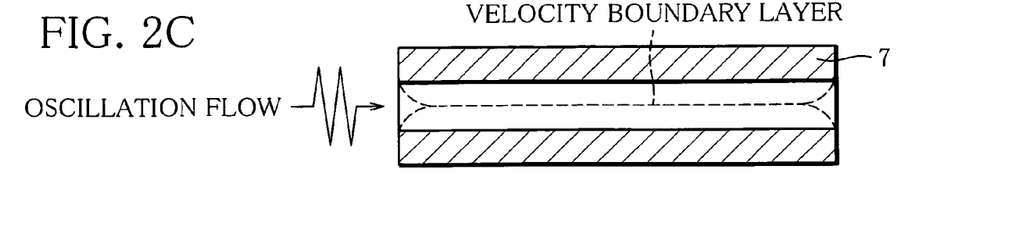

The velocity boundary layer will be described below. Needless to say, when there is no flow flowing through the narrow pipe 7, the velocity boundary layer does not exist as shown in FIG. 2A. If an oscillation flow caused by the dilatational wave runs into the narrow pipe 7 in the above state, the velocity boundary layer is created in the narrow pipe 7 as shown in FIGS. 2B and 2C. The shape of the velocity boundary layer formed in the narrow pipe 7 depends upon amplitude and cycle of the oscillation flow, the shape of the narrow pipe 7, and the like. The velocity boundary layer simply grows up to prescribed thickness dv. Therefore, if the narrow pipe 7 has a large flow-channel sectional size (pipe diameter) as shown in FIG. 2B, the velocity boundary layer is formed just along an inner wall of the narrow pipe 7. In contrast, if the narrow pipe 7 has a small flow-channel sectional size (pipe diameter) as shown in FIG. 2C, the velocity boundary layer grows until filling the inside of the narrow pipe 7.

Figure 3A:
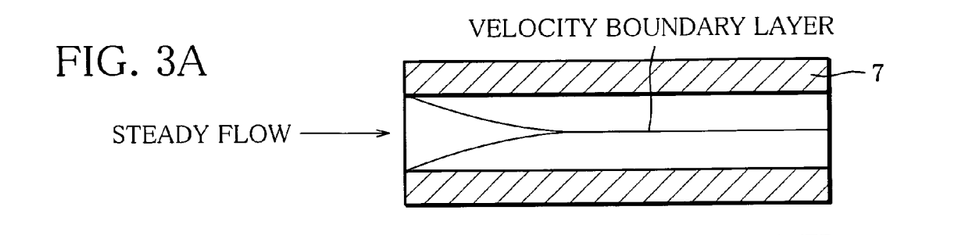
FIGS. 3A, 3B and 3C each diagrammatically show a velocity boundary layer that is produced in a narrow pipe due to an oscillation flow when there is a steady flow.
Figure 3B:
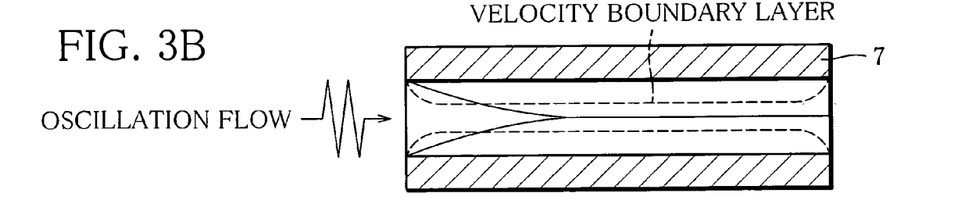
Figure 3C:
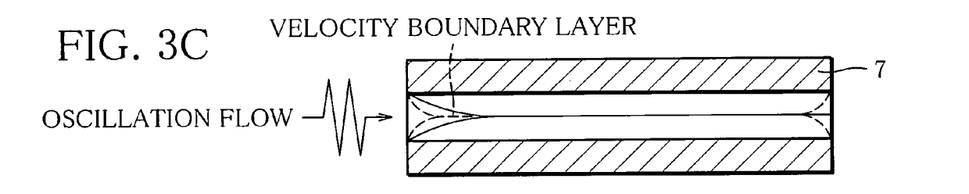

If there is a fluid flow (steady flow) in the narrow pipe 7, the velocity boundary layer is formed in the narrow pipe 7 due to the fluid flow itself as shown in FIG. 3A. The length required for the velocity boundary layer to fully grow is determined solely by pipe diameter D and Reynolds number Re of the fluid. If the oscillation flow enters the narrow pipe 7 in the above state, the velocity boundary layer is uniformly created from an inner wall surface of the narrow pipe 7 as shown in FIGS. 3B and 3C. If the narrow pipe 7 has a small flow-channel sectional size (pipe diameter), as shown in FIG. 3C, the velocity boundary layer grows until filling the entire narrow pipe 7 as in the case where there is no flow.

The dissipating of the energy possessed by the dilatational wave (dilatational wave energy) is caused by pressure energy being converted into thermal energy due to viscosity of the gas flowing along the inner wall of the narrow pipe 7 in the boundary layer and by the thermal energy being released outside through the narrow pipe 7. As a result, the energy of the dilatational wave is dissipated outside due to the velocity boundary layer that is formed to fill the entire flow-channel section of the narrow pipe 7. Accordingly, the transmission of the dilatational wave is prevented. The thickness of the velocity boundary layer dv is expressed as follows:

$$dv = (2\mu/\rho\omega)^{1/2}$$

where $\mu$, $\rho$ and $\omega$ represent viscosity coefficient, fluid density, and angular frequency of the dilatational wave, respectively.

A power loss ratio Wi with respect to the diameter D of the narrow pipe 7 is determined as follows:

$$Wi = \{dv + (\kappa - 1)dh\} \cdot (\pi D/S)$$

where S is the sectional area of the flow channel, and $\kappa$ is specific-heat ratio. However, the power loss ratio Wi with respect to the length of the narrow pipe 7 is considered to be proportional to the length, depending upon how the velocity boundary layer is formed. Therefore, if the length of the narrow pipe 7 is increased, an effect of blocking the dilatational wave is accordingly improved. On the other hand, the longer the length of the narrow pipe 7 is, the larger the flow-channel resistance becomes. This causes the problem of pressure loss with respect to the gas flow. It is then necessary to determine the length of the narrow pipe 7 according to balance the dilatational wave-blocking effect and the pressure loss.

Figure 4A:
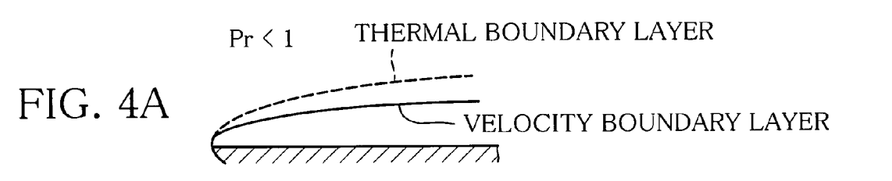
FIGS. 4A, 4B and 4C each show relationship between the velocity boundary layer and a thermal boundary layer.
Figure 4B:
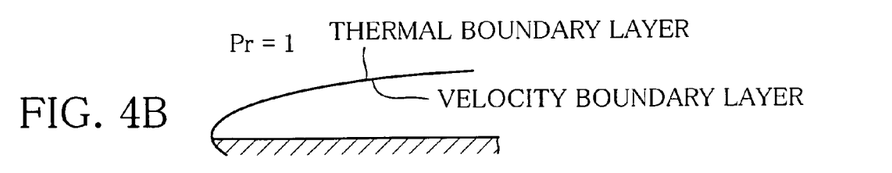
Figure 4C:
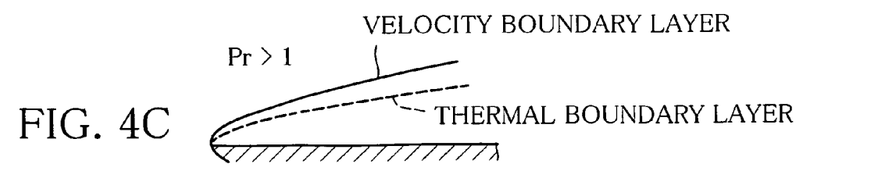

A thermal boundary layer will be described below. Thickness dh of the thermal boundary layer is changed by the fluid viscosity and the like. To be specific, if Prandtl number Pr, which is defined as a ratio of degree of momentum transmitted into the fluid and degree of heat quantity, is equal to 1, the velocity and thermal boundary layers are equal to each other as shown in FIG. 4B. For example, if Prandtl number Pr is less than 1 as in mercury, the thermal boundary layer grows thicker than the velocity boundary layer as shown in FIG. 4A. If Prandtl number Pr is more than 1 as in oil, the thermal boundary layer is thinner than the velocity boundary layer as shown in FIG. 4C. The thickness dh of the thermal boundary layer in this case is expressed as follows:

$$dh = (2K/\rho\omega Cp)^{1/2}$$

where K and Cp are thermal conductivity and isopiestic specific heat, respectively.

Figure 5:
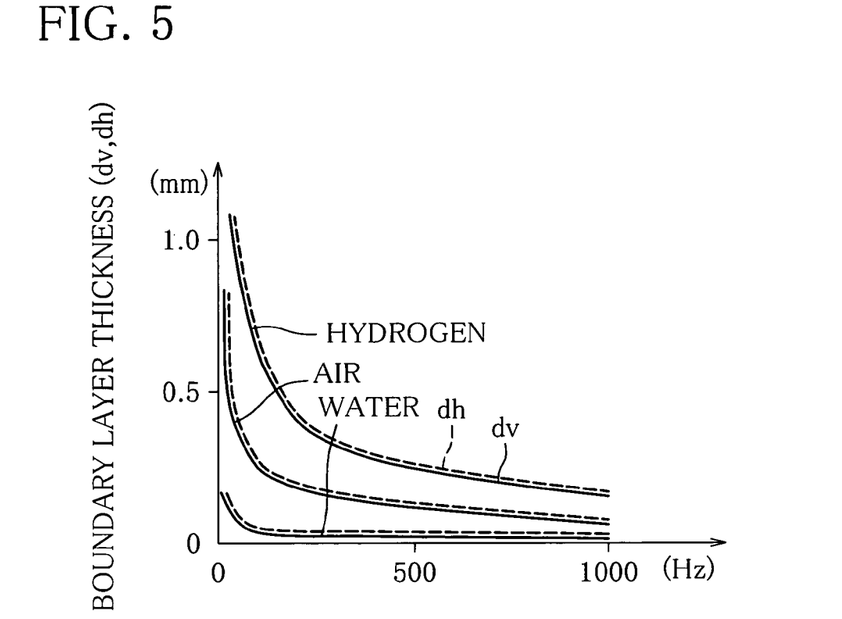
FIG. 5 shows changes in thickness of boundary layers of hydrogen, air and water when the frequency of a dilatational wave varies.

TABLE 1 shows the thickness dv of the velocity boundary layer and the thickness dh of the thermal boundary layer of air, hydrogen, and water in cases where the frequency of the dilatational wave is 10 Hz, 50 Hz, 100 Hz and 500 Hz. Frequency dependence as illustrated in FIG. 5 is shown in TABLE 1. In FIG. 5, solid lines indicate changes of the thickness dv of the velocity boundary layer, and broken lines denote those of the thickness dh of the thermal boundary layer.

TABLE 1

|  | 10 Hz | | 50 Hz | | 100 Hz | | 500 Hz | |
| --- | --- | --- | --- | --- | --- | --- | --- | --- |
|  | dv | dh | dv | dh | dv | dh | dv | dh |
| Air | 0.71 | 0.84 | 0.32 | 0.37 | 0.22 | 0.27 | 0.10 | 0.12 |
| Hydrogen | 1.87 | 2.22 | 0.83 | 0.99 | 0.59 | 0.70 | 0.26 | 0.31 |
| Water | 0.17 | 0.07 | 0.07 | 0.03 | 0.55 | 0.02 | 0.02 | 0.01 |

(mm)

Figure 6:
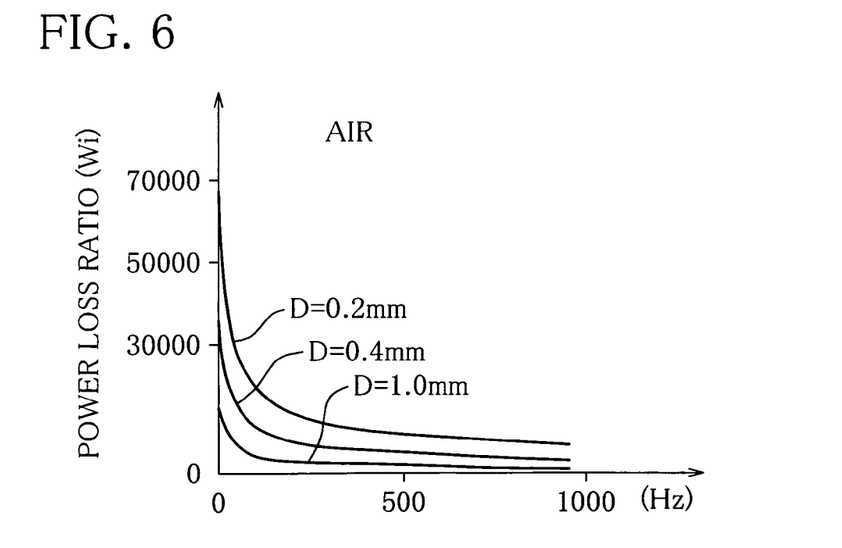
FIG. 6 shows changes of a power loss ratio with respect to air when the narrow pipe is changed in diameter.
Figure 7:
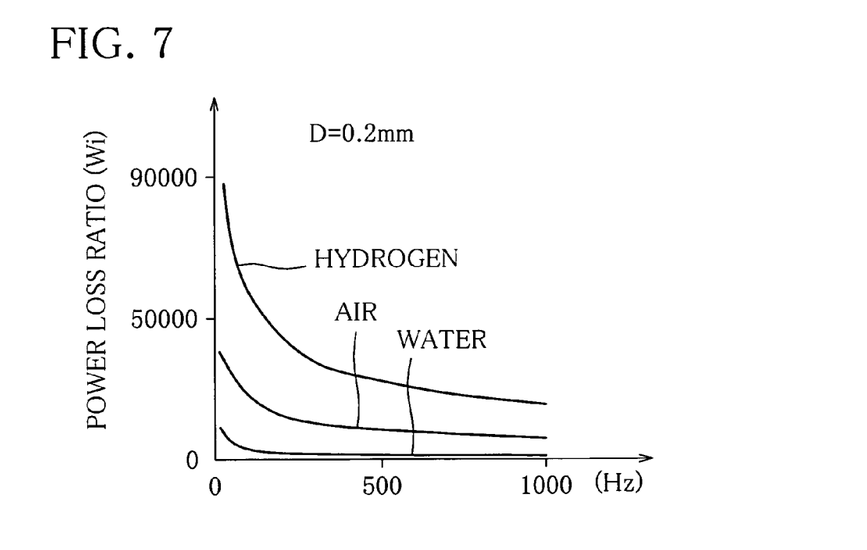
FIG. 7 shows changes of a power loss ratio with respect to hydrogen, air, and water when the diameter of the narrow pipe is fixed.

TABLE 2 shows the power loss ratio Wi per wavelength with respect to air, hydrogen, and water when the diameter of the narrow pipe 7 is 0.2 mm, 0.4 mm and 1.0 mm. FIG. 6 shows frequency characteristics of the power loss ratio Wi with respect to air, which is caused by difference of the diameter D of the narrow pipe 7. FIG. 7 shows frequency characteristics of the power loss ratio Wi with respect to hydrogen, air, and water when the diameter D of the narrow pipe 7 is set to be fixed (0.2 mm).

TABLE 2

| | Diameter of the narrow pipe: 0.2 mm | | | Diameter of the narrow pipe: 0.4 mm | | | Diameter of the narrow pipe: 1.0 mm | | |
| --- | --- | --- | --- | --- | --- | --- | --- | --- | --- |
| | Air | Hydrogen | Water | Air | Hydrogen | Water | Air | Hydrogen | Water |
| 10 Hz | 65664 | 174443 | 10422 | 32832 | 87221 | 5211 | 13133 | 34889 | 2084 |
| 50 Hz | 29366 | 78013 | 4661 | 14683 | 39007 | 2330 | 5873 | 15603 | 932 |
| 100 Hz | 20756 | 55164 | 3296 | 10382 | 27582 | 1648 | 4153 | 11033 | 659 |
| 500 Hz | 9286 | 24670 | 1474 | 4643 | 12335 | 737 | 1857 | 4934 | 295 |

These frequency characteristics reveal that the power loss ratio Wi is reduced along with an increase in frequency of the dilatational wave, and that the power loss ratio Wi can be maintained high in some measure by reducing the pipe diameter D. For example, when the fluid is air, the frequency of the dilatational wave produced by oscillation is generally 100 Hz or less, and is about 500 Hz at the highest in consideration of an upper limit of response frequency of the sensor. On the basis of this fact, if the diameter D of the narrow pipe 7 is set approximately twice as large as the thickness dv (0.1 mm) of the velocity boundary layer, that is, 0.2 mm, it is possible to dissipate the energy of the dilatational wave and effectively block the transmission of the dilatational wave with respect to all dilatational waves whose frequencies are 500 Hz or less.

As Prandtl number Pr at normal pressure in a general gas, such as He, Ne, Ar, Kr, $H_2$, $N_2$, $O_2$, Air, CO, $CO_2$, NO, $N_2O$, $SO_2$, $NH_3$, $SF_6$, $CH_4$, $C_2H_2$, $C_2H_4$, $C_2H_6$, $C_3H_6$, and $C_3H_8$, ranges from about 0.65 to about 0.75. Therefore, it can be considered that the thickness dv of the velocity boundary layer and the thickness dh of the thermal boundary layer are substantially equal to each other. If an object (fluid) to be measured in terms of flow rate is a general gas listed above, the narrow pipe 7 that carries out an operation of blocking the transmission of the dilatational wave can be realized simply by setting the pipe diameter approximately twice as large as the thickness of the boundary layer that is produced by the dilatational wave. The pipe length of the narrow pipe 7 is sufficient if the boundary layer produced by the dilatational wave can be formed inside the narrow pipe 7. Since the narrow pipe 7 is a part of the flow channel 1, the longer the flow channel is, the greater the pressure loss becomes.

Accordingly, in consideration of the pressure loss, it is preferable that the pipe length should be set as short as possible within a range where the above conditions are satisfied.

Depending on the fluid to be measured and the frequency, the thickness of the velocity boundary layer is occasionally larger than that of the thermal boundary layer. In this case, by setting the diameter of the narrow pipe 7 approximately twice as large as the thickness of the thermal boundary layer, the energy of the dilatational wave can be effectively dissipated, to thereby block the transmission of the dilatational wave.

Figure 8A:
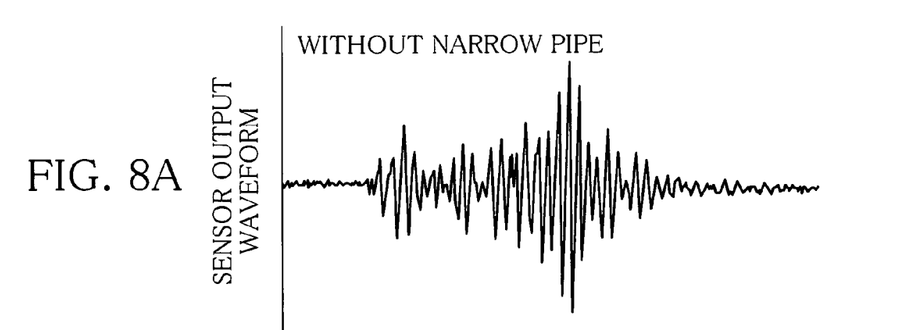
FIGS. 8A, 8B and 8C show changes of an output of a flow rate sensor, which are caused by the presence or lack of the narrow pipe in contrast with each other.
Figure 8B:
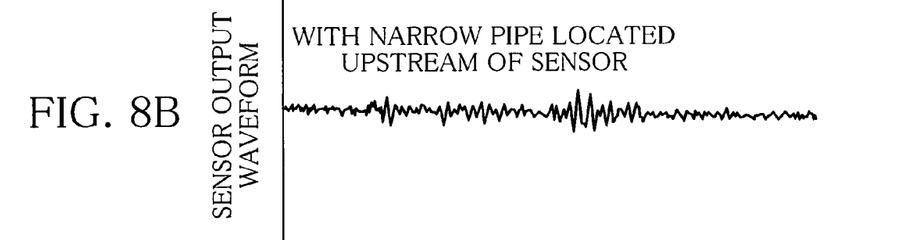
Figure 8C:
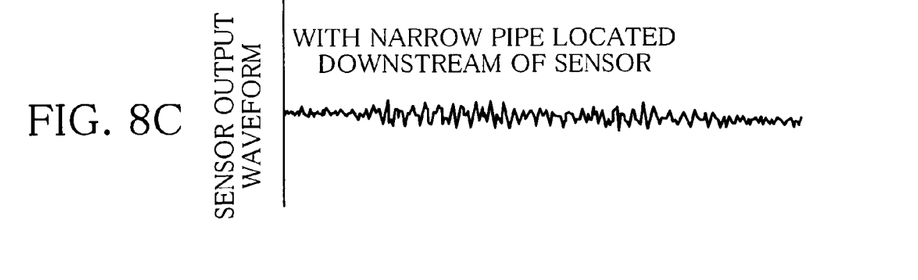

FIG. 8 shows results of an experiment for examining the effect of attenuating the dilatational wave, which is achieved by the narrow pipe 7. FIGS. 8A, 8B and 8C show an output of the flow rate sensor 3 without the narrow pipe 7, with the narrow pipe 7 placed upstream of the flow rate sensor 3, and with the narrow pipe 7 placed downstream of the flow rate sensor 3, respectively. These experiment were conducted on the condition that a dilatational wave was produced in the flow channel 1 by applying impacts to the flowmeter body 2 in a state where there was no gas flowing through the flow channel 1. As shown in the experiment results, it was revealed that an installation of the above-specified narrow pipe 7 in the flow channel 1 effectively eliminated the dilatational wave transmitted through the flow channel 1, that is, prevented the dilatational wave energy from reaching the flow rate sensor 3 by dissipating the energy.

It is not known about a mechanism of the effect of eliminating an influence of the dilatational wave on the flow rate sensor 3 in the situation where the narrow pipe 7 (micro path) is set downstream of the flow rate sensor 3. It is considered, however, that the flow rate sensor 3 detects fluctuation of gas molecules in the flow channel 1, which is caused by the dilatational wave (pressure wave) transmitted through the flow channel at high speed. It is assumed that when the narrow pipe 7 is disposed downstream of the flow rate sensor 3, the dilatational wave is absorbed before the fluctuation of the gas molecules in the flow channel 1 occurs.

Figure 9A:
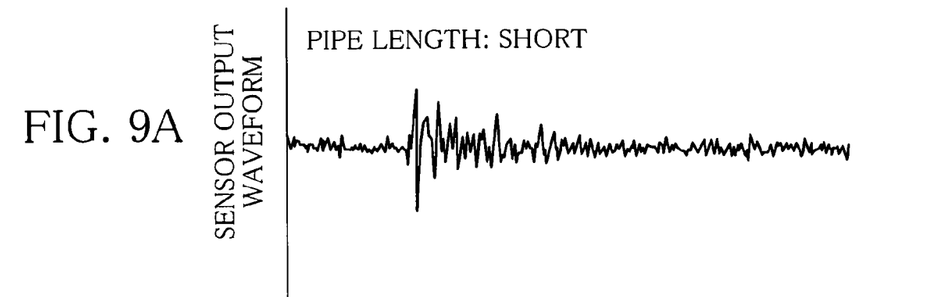
FIGS. 9A and 9B show dilatational wave-removing effects which are determined by length of the narrow pipe in contrast with each other.
Figure 9B:
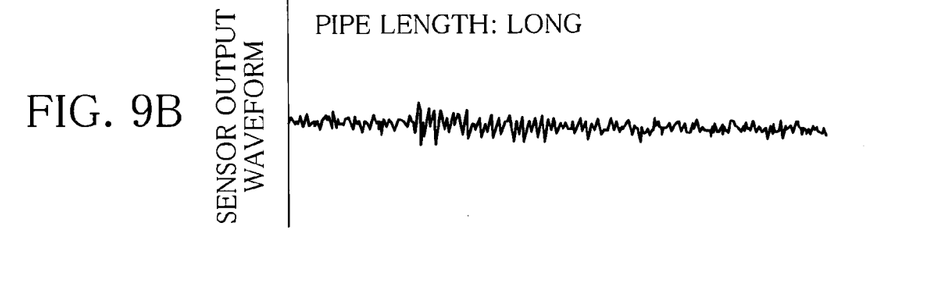
Figure 10:
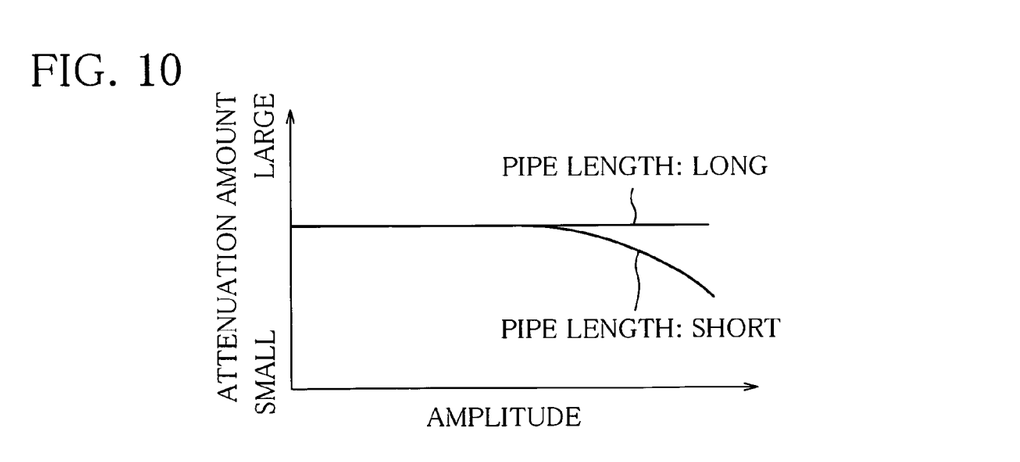
FIG. 10 shows attenuation properties of the narrow pipe.

FIGS. 9A and 9B are results of the experiment for examining the effect of attenuating the dilatational wave when the length of the narrow pipe 7 is changed. FIG. 9A shows the output of the flow rate sensor 3 when the pipe length is short, and FIG. 9B when the pipe length is long. The experiment was carried out on the condition that a dilatational wave was produced in the flow channel 1 by applying impacts to the flowmeter body 2 in a state where there was no gas (fluid) flowing through the flow channel 1. It was found from the result of the experiment that a sufficient effect of attenuating the dilatational wave could not be expected unless the pipe length of the narrow pipe 7 is long in some measure, that is, unless the boundary layer produced inside the narrow pipe 7 due to the dilatational wave has long length to some degree. It was also proven that, depending on the pipe length of the narrow pipe 7, for example, there was a change in an attenuation amount of amplitude of the dilatational wave as shown in FIG. 10, and that a longer pipe length could provide more sufficient effect of attenuating even a large amplitude. It became clear that especially a dilatational wave having a low frequency of about 100 Hz or less could be sufficiently attenuated. As illustrated in FIG. 22 showing a dilatational wave-attenuating properties of the narrow pipe 7 by dashed line in comparison with sound-reducing properties (solid line) of a conventional single hollow silencer, it was turned out that, roughly speaking, a required attenuation amount of the dilatational wave could be achieved within a wide frequency range.

In general, a flowmeter of this type is required, albeit depending on specifications thereof, to be capable of measuring a minimal flow rate, for example, with a measurement accuracy of ±0.5 percent of the full-scale value within 1.5 seconds or less. In this light, narrow pipes with internal diameters of 0.1 mm, 0.2 mm, 0.3 mm, 0.4 mm, 0.5 mm and 0.8 mm were prepared so that the above conditions were satisfied. These narrow pipes having different lengths were applied with shock waves, and detection accuracy and response speed were evaluated. Results will be described below. This experiment was conducted under a situation where an oscillation is assumed to occur in a device installed with the flowmeter, and the pipe system is applied with acceleration that is obtained from the oscillation.

Figure 11:
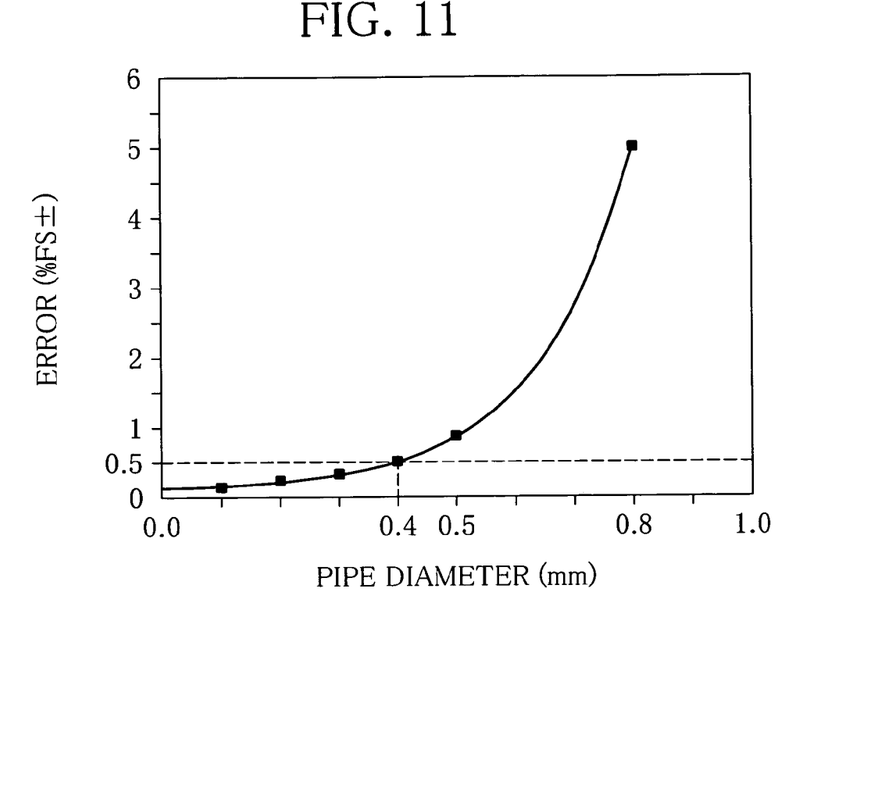
FIG. 11 shows changes in measurement accuracy, which are caused by difference of a pipe diameter of the narrow pipe.

A comparison was made between an output value of the flowmeter which was obtained when the oscillation is applied and an output value when the oscillation is not applied, to thereby find percentage of error. A result is shown in FIG. 11. It was found from the experiment result shown in FIG. 11 that if the pipe diameter was set in a range of from 0.1 mm to 0.4 mm, the measurement accuracy was ±0.5 percent or less of the full-scale value. In other words, it is possible to reduce the influence of the dilatational wave (pressure wave) produced by the oscillation by fully exerting the effect of dissipating the energy with respect to the dilatational wave.

Figure 12:
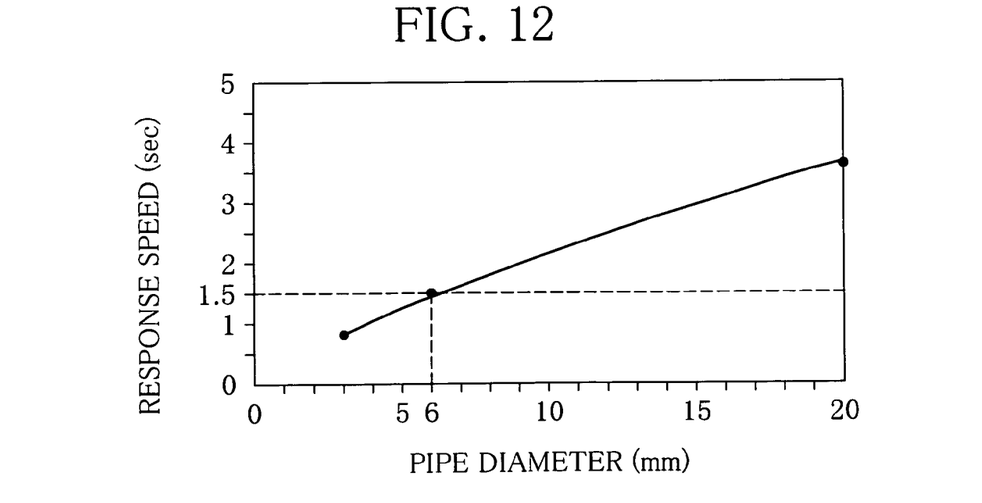
FIG. 12 shows changes of detection response speed, which are caused by difference of the length of the narrow pipe.

Concerning the detection response, as in FIG. 12 showing an example in which the length of the narrow pipe with a diameter of 0.2 mm is changed, the experiment result proves that it is possible to achieve a required response of within 1.5 seconds or less when the pipe length is in a range of from 3.0 mm to 6.0 mm. As to the narrow pipe with a diameter of 0.3 mm, the response of within 1.5 seconds or less can be achieved when the pipe length ranges from 4.5 mm to 13.5 mm. The narrow pipe with a diameter of 0.4 mm provides the response of within 1.5 seconds or less when the pipe length ranges from 6.0 mm to 24.0 mm.

If a required measurement flow rate cannot be achieved with the proper pipe diameter and length of the narrow pipe 7, which are found on the basis of the fluid to be measured, the assumed frequency, etc., this problem can be solved by providing a plurality of narrow pipes 7. That is to say, the energy of the dilatational wave can be effectively dissipated by the narrow pipes 7 while maintaining the required measurement flow rate.

Figure 13:
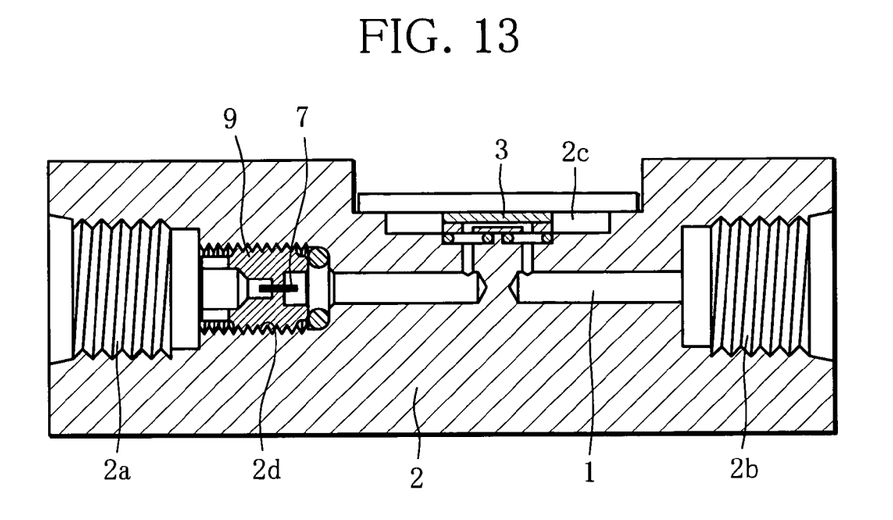
FIG. 13 is a schematic configuration view of a flowmeter according to one embodiment of the invention.

FIG. 13 shows a specific configuration example of the flowmeter that is realized by installing the narrow pipe 7. Reference numeral 2 denotes a flowmeter body in which a flow channel 1 is formed. Reference numeral 3 represents a flow rate sensor installed in the flowmeter body 2 so as to face the flow channel 1, and reference numeral 7 a narrow pipe (micro path) that is installed in the flow channel 1. The flowmeter body 2 is a block body in which female screws 2a and 2b connecting with pipes, not shown, are formed at both ends of the flow channel 1 fabricated in the flowmeter body 2. A mounting portion 2c for the flow rate sensor 3 is provided in substantially the center of an upper face of the block body (flowmeter body) 2 in a recessed shape. The flow channel 1 is formed to run through the sensor-mounting portion 2c.

The flow rate sensor 3 is mounted on a base substance made of glass or the like, in which a groove-like flow channel is formed, and is packaged as a so-called sensor chip with a flow channel. By fixing the packaged flow rate sensor (sensor chip with a flow channel) 3 to the mounting portion 2c, the flow channel 1 is fabricated, which links the female screws 2a and 2b through the flow channel formed integrally with the flow rate sensor 3, and the flow rate sensor 3 is positioned to face the flow channel 1. Although not particularly shown, in the flow rate sensor 3, two temperature-sensitive resistive elements are disposed on a choke made of silicon nitride, silicon oxide or the like, which is formed in the surface of a silicon substrate, with a heating resistive element therebetween as viewed in a fluid flowing direction, as described in Unexamined Japanese Patent Publication No. 2006-118929. The choke is placed in the flow channel 1 so that the fluid flows along the surface of the sensor.

Figure 14:
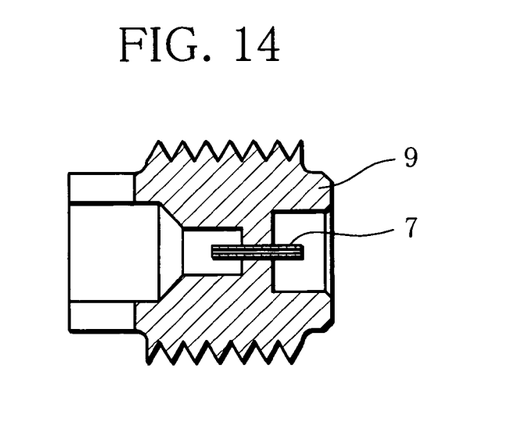
FIG. 14 shows a unitized structure of the narrow pipe that is installed in the flowmeter shown in FIG. 13.

The narrow pipe 7 to be installed in the block body (flowmeter body) 2 is fixed to a bolt-shaped narrow-pipe supporting body 9 so as to penetrate an axis of the supporting body 9 as shown in FIG. 14. The narrow-pipe supporting body 9 is installed in the block body 2 through a female screw 2d having a smaller diameter than the female screw 2a that is positioned an inlet side of the flow channel 1. In this manner, the narrow-pipe supporting body 9 is installed in the flow channel 1. The narrow pipe 7 is a pipe having, for example, an internal diameter (caliber) of 0.2 mm and a length ranging from about 3 mm to about 6 mm. In this specification, the narrow-pipe supporting body 9 is interfitted in an inner wall of the flow channel 1. However, the narrow-pipe supporting body 9 may be interfitted in the inner wall of the flow channel by using an O-ring. If the narrow pipe 7 is fixed to the flow channel 1 in this manner, the gas entering from the female screw 2a that is the inlet of the flow channel 1 is guided into the flow channel 1 through the narrow pipe 7. The gas then passes through the installing portion (mounting portion 2c) of the flow rate sensor 3, and flows out from the female screw 2b that is an outlet of the flow channel 1.

In the embodiment illustrated in FIGS. 13 and 14, it is also possible to directly pierce the micro path in the narrow-pipe supporting body 9, instead of providing the narrow pipe 7.

With the flowmeter having the structure in which the flow rate sensor 3 is set to face the flow channel 1, and the narrow pipe 7 is installed in the flow channel 1, even if a dilatational wave (pressure wave) is created in the flow channel 1 due to impacts applied to the flowmeter body 2 and the pipes, not shown, which are jointed to the flowmeter body 2, the narrow pipe 7 prevents the dilatational wave (pressure wave) from being transmitted to the flow rate sensor 3. It is then possible to carry out the flow rate measurement with high accuracy without an influence of the dilatational wave while fully exerting the properties of the flow rate sensor 3. In short, the dilatational wave is not erroneously detected as a gas flow rate when there is no gas flow.

As to apparatuses (spatter, etcher, CVD, etc.) used in a deposition process of a semiconductor-manufacturing step, when a flow rate of fluid (various gases) used in these apparatuses is measured within a minimal flow rate range, the dilatational wave is not erroneously detected as flow rate of the fluid. It is therefore possible to measure the minimal flow rate with high accuracy. For example, when a minimal flow rate (200 mL/min or less; in some cases, 50 mL/min or less) of the gas used in a thin-film forming apparatus (deposition apparatus) is to be measured, a dilatational wave is not erroneously detected as a gas flow rate. This makes it possible to measure a minimal flow rate with high accuracy.

Furthermore, the invention has a simple and compact structure in which the narrow pipe 7 is provided to the flow channel 1, and it is not necessary to install a conventional single hollow silencer or the like. Therefore, the invention provides practically significant advantages, such as that the flow channel is simply constructed and can be fabricated at low cost. Especially, it is possible to realize the flowmeter that fully exerts the properties of the thermal flow rate sensor 3 capable of detecting a minimal flow rate with high sensitivity and excellent response. When there is a pulsation wave (a type of dilatational wave) in a flow, the structure in which the narrow pipe 7 is disposed in the flow channel 1 makes it possible to suppress the pulsation created near the flow rate sensor 3 and to accomplish an accurate measurement.

Figure 15:
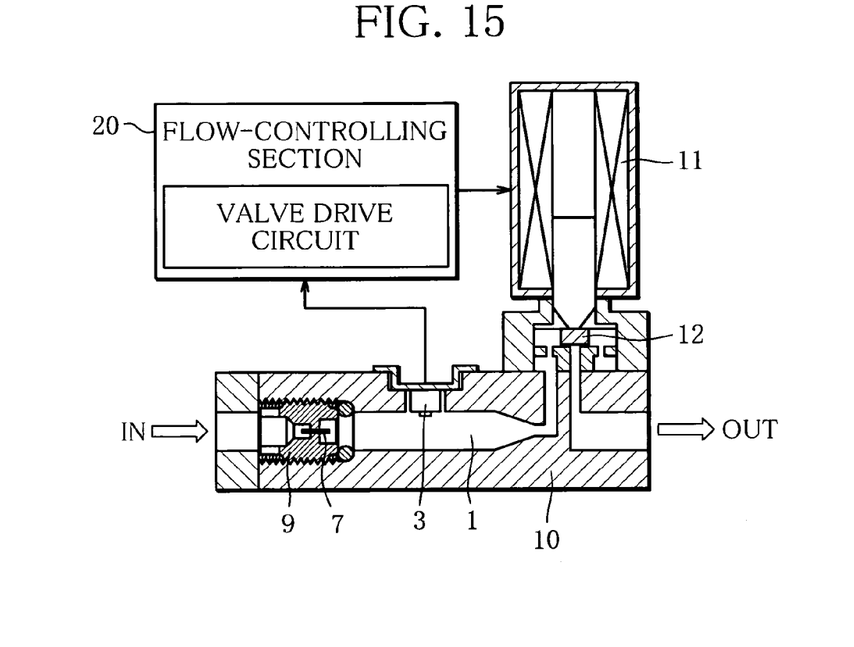
FIG. 15 is a schematic configuration view of a flow control device according to one embodiment of the invention.

FIG. 15 shows an embodiment in which the flow control device using the flowmeter with the above structure is realized. To be specific, a flow control valve 12 whose opening angle is regulated by a proportional solenoid mechanism 11 is mounted on a body (corresponding to the block body 2) 10 having a flow channel 1. A flow rate sensor 3 is attached to the body 10 so as to be located in the flow channel 1. The proportional solenoid mechanism 11 is controlled by a flow-controlling section 20 having a valve drive circuit according to an output of the flow rate sensor 3. A narrow-pipe supporting body 9 having a narrow pipe 7 is fixed to a body 1. By so doing, the narrow pipe 7 is installed in the flow channel 1.

The flow control device illustrated in FIG. 15 blocks a dilatational wave from being transmitted to the flow rate sensor 3. This effectively prevents a false output of the flow rate sensor 3. It is then possible to avoid the problem that the proportional solenoid mechanism 11 is driven by the output of the flow rate sensor 3, or the proportional solenoid mechanism 11 is improperly operated by changes of an output value of the flow rate sensor 3, in spite that there is no fluid flow. Therefore, there are advantages, such as that the control accuracy thereof is sufficiently enhanced.

Figure 16:
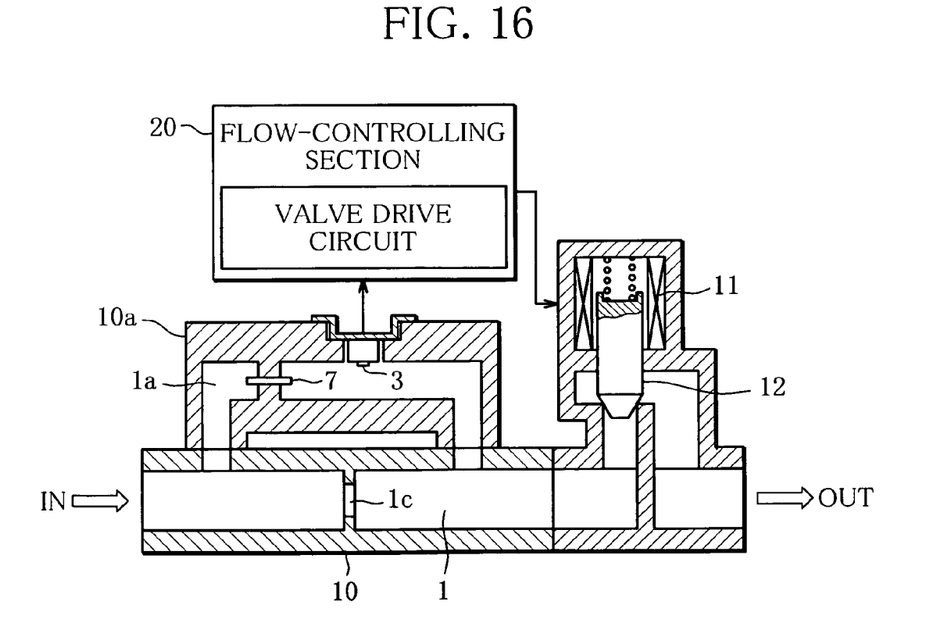
FIG. 16 is a schematic configuration view of a flow control device according to another embodiment of the invention.

FIG. 16 shows another embodiment of the flow control device. In this embodiment, a flow control valve 12 whose opening angle is regulated by a solenoid mechanism 11 is connected to a body 10 having a main channel 1. The body 10 is provided with another body 10*a* having a bypass channel 1*a* that bypasses the flow channel 1. The body 10*a* is attached with a flow rate sensor 3 positioned in the bypass channel 1*a*. A choke 1*c* is provided to the main channel 1. The choke 1*c* makes a pressure gradient between the upstream and downstream of the choke 1*c* so that the fluid runs through the bypass channel 1*a* as well. The solenoid mechanism 11 is controlled by a flow-controlling section 20 with a valve drive circuit according to an output of the flow rate sensor 3. A narrow-pipe supporting body 9 having a narrow pipe 7 is fixed to the body 10*a*. By so doing, the narrow pipe 7 is installed in the bypass channel 1*a*. As in the foregoing embodiments, an internal diameter and length of the narrow pipe 7 are so determined as to block the transmission of a dilatational wave that is created in the fluid flowing through the bypass channel 1*a*.

According to the embodiment shown in FIG. 16, since the narrow pipe 7 blocks the transmission of the dilatational wave to the flow rate sensor 3, a false detection of the flow rate sensor 3 is effectively prevented. Because of the flow rate sensor 3 disposed in the bypass channel 1*a*, a flow rate of the flow channel 1 can be set higher than the flow rate in the embodiment illustrated in FIG. 15.

In the structure including the bypass channel as in the embodiment illustrated in FIG. 16, temperature characteristics are intensified, that is, a split ratio (ratio of the flow rate of the fluid flowing through the bypass channel to that through the main channel) is liable to be changed by temperature. More specifically, a rise in gas temperature increases the viscosity of the gas and consequently develops resistance in the narrow pipe. As a result, a tendency occurs to reduce the flow rate of the gas flowing through the narrow pipe. To solve this problem, according to another embodiment shown in FIG. 17, a plurality of narrow pipes 7 of the same size as the narrow pipe 7 located in the bypass channel 1*a* are arranged parallel to each other in between an inlet and an outlet of the bypass channel 1*a* of the main channel 1. This makes it possible to provide a structure in which the split ratio of the bypass channel 1*a* is not altered due to a temperature change. The number of the narrow pipes 7 to be provided to the flow channel 1 serving as the main channel is determined by the flow rate of the fluid flowing through the flow channel 1.

Figure 17:
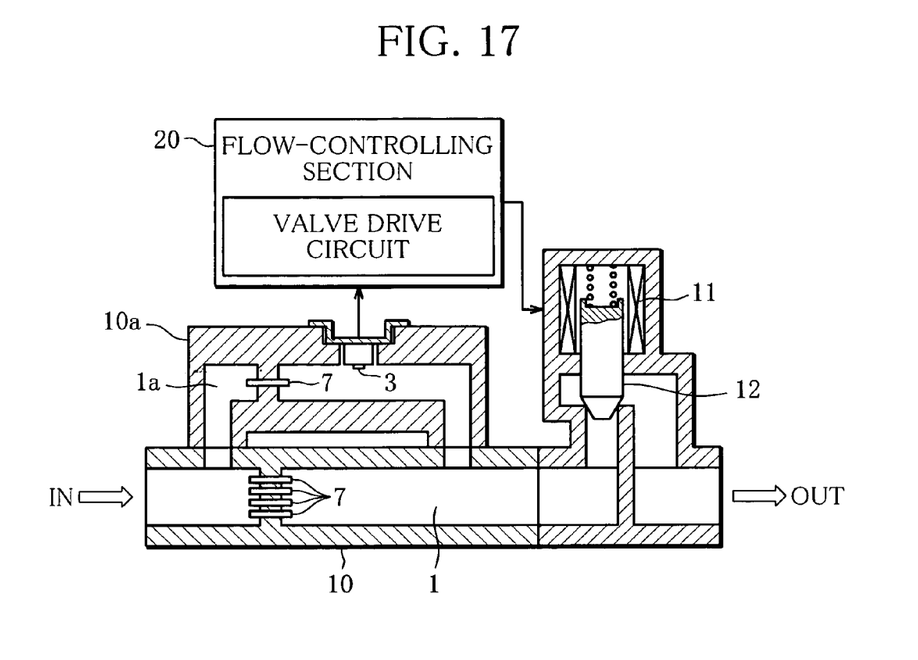
FIG. 17 is a schematic configuration view of a flow control device according to still another embodiment of the invention.

The embodiment shown in FIGS. 16 and 17 relates to the flow control device having the flow control valve 12. Needless to say, however, the structure, in which the flow rate of the fluid flowing through the main channel is measured by using the flow rate sensor placed in the bypass channel, the narrow pipe 7 in the bypass channel, and if needed, the narrow pipes 7 that may be disposed in the main channel, may be used exclusively for measuring the flow rate of the fluid flowing through the main channel.

The invention is not limited to the above-described embodiments. For instance, the channel diameter and channel length of the narrow pipe 7 are determined so that the dilatational wave energy in the boundary layer can be dissipated. The number of the narrow pipes 7 to be installed in the flow channel 1 can be determined according to pressure loss, maximum flow rate, etc. The flow rate sensor 3 can be applied as long as it is designed according to the measurement specifications. The structure of the flow rate sensor 3 is not particularly restricted.

Figure 18:
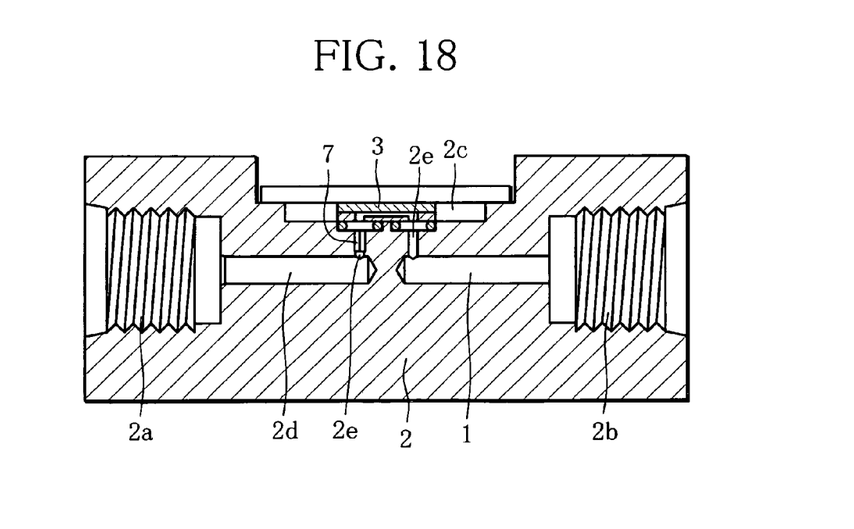
FIG. 18 is a schematic configuration view of a flowmeter according to another embodiment of the invention.
Figure 19:
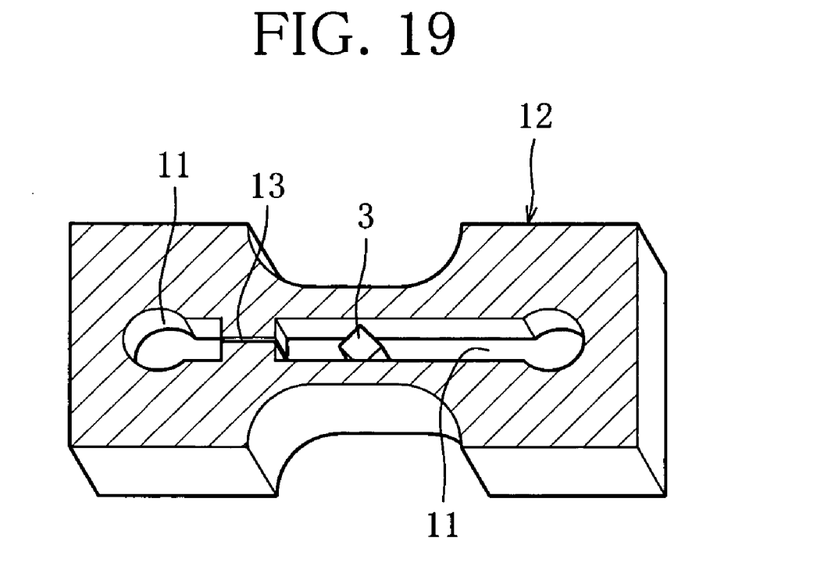
FIG. 19 is a schematic configuration view of a main part of a flowmeter according to still another embodiment of the invention.

As illustrated in FIG. 18, it is absolutely possible to install the narrow pipe 7 in a small-diameter communication path 2*e* or the like which links the mounting portion 2*c* for the flow rate sensor 3, which is formed in substantially the center of the upper face of the block body (flowmeter body) 2, and a main path 2*d* of the block body 2. Furthermore, as illustrated in FIG. 19 showing a schematic structure of a sensor chip with a flow channel, it is also possible to fabricate a groove-like flow channel 11 and form the narrow pipe 7 directly in the flow channel (groove) 11 in a base body 12 made of glass or the like, in which the flow rate sensor 3 is attached to the flow channel 11. In this case, a part of the groove 11 forming the flow channel is formed as a micro path 13 with small width. Specifically, when the groove (flow channel) 11 is formed, for example, by etching the base body 12 made of glass or the like, the micro path 13 with prescribed micro width may be formed in a part of the groove 11 by changing a mask pattern.

It is natural that the diameter and length of the narrow pipe 7 are set according to a type of the fluid to be measured in terms of flow rate. The same is true of other fluids than hydrogen, air and water. The micro path 13 (narrow pipe 7) is not necessarily formed in a straight line as long as it provides the function of dissipating the dilatational wave energy. In addition, the invention may be modified in various ways without deviating from the gist of the invention.

The invention claimed is:

1. A flowmeter comprising:
  a thermal flow rate sensor that is placed to face a flow channel and detects a flow rate of fluid flowing through the flow channel, and
  a micro path that is formed in the flow channel and blocks a dilatational wave created in the flow channel from being transmitted to the thermal flow rate sensor, wherein the micro path is located upstream or downstream of the thermal flow rate sensor in the flow channel to reduce a flow-channel sectional area of the flow channel, and the micro path has a flow-channel sectional size that is approximately twice as large as a thickness of a boundary layer produced by the dilatational wave created in the micro path.

2. The flowmeter according to claim 1, wherein the micro path has enough length to form the boundary layer produced by the dilatational wave inside of the micro path.

3. The flowmeter according to claim 1, wherein the boundary layer thickness is a thickness of one of a velocity boundary layer and a thermal boundary layer, whichever is thinner, which is created by the dilatational wave.

4. The flowmeter according to claim 1, wherein the micro path is formed by detachably installing a member into the flow channel formed in a body of the flowmeter so as to occlude the flow channel, and piercing the member.

5. The flowmeter according to claim 1, wherein the micro path is formed by providing a narrow pipe having a prescribed flow-channel sectional area and a prescribed flow-channel length; and wherein the narrow pipe is fixed in a member so as to penetrate the member, which is detachably installed into the flow channel formed in a body of the flowmeter to occlude the flow channel.

6. A flowmeter comprising:

a bypass channel that bypasses from a main channel;

a thermal flow rate sensor that is interposed in the bypass channel; and a micro path that is formed in the bypass channel and blocks a dilatational wave created in the bypass channel from being transmitted to the thermal flow rate sensor, wherein the micro path is located upstream or downstream of the thermal flow rate sensor in the bypass channel to reduce a flow-channel sectional area of the bypass channel, and the micro path has a flow-channel sectional size that is approximately twice as large as a thickness of a boundary layer produced by the dilatational wave created in the micro path.

7. The flowmeter according to claim 6, further comprising a plurality of micro paths which have substantially the same size as the micro path that is formed in the bypass channel, and which are formed in the main channel parallel to each other.

8. A flow control device comprising the flowmeter according to claim 1, a flow control valve that regulates the flow rate of fluid flowing through the flow channel, and a control unit that controls an opening angle of the flow control valve according to an output of the flowmeter.

9. A flow control device comprising the flowmeter according to claim 2, a flow control valve that regulates the flow rate of fluid flowing through the flow channel, and a control unit that controls an opening angle of the flow control valve according to an output of the flowmeter.

10. A flow control device comprising the flowmeter according to claim 3, a flow control valve that regulates the flow rate of fluid flowing through the flow channel, and a control unit that controls an opening angle of the flow control valve according to an output of the flowmeter.

11. A flow control device comprising the flowmeter according to claim 4, a flow control valve that regulates the flow rate of fluid flowing through the flow channel, and a control unit that controls an opening angle of the flow control valve according to an output of the flowmeter.

12. A flow control device comprising the flowmeter according to claim 5, a flow control valve that regulates the flow rate of fluid flowing through the flow channel, and a control unit that controls an opening angle of the flow control valve according to an output of the flowmeter.

13. A flow control device comprising the flowmeter according to claim 6, a flow control valve that regulates a flow rate of fluid flowing through the main channel, and a control unit that controls an opening angle of the flow control valve according to an output of the flowmeter.

14. A flow control device comprising the flowmeter according to claim 7, a flow control valve that regulates a flow rate of fluid flowing through the main channel, and a control unit that controls an opening angle of the flow control valve according to an output of the flowmeter.

* * * * *